(No Model.)
S. G. POPE.
CUTTER HEAD.
No. 290,923. Patented Dec. 25, 1883.
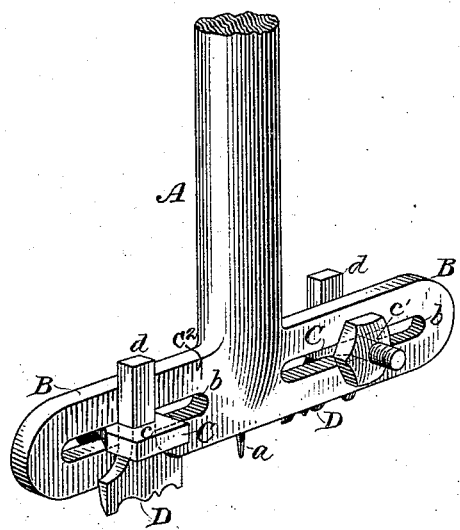
WITNESSES
Wm A. Skinkle
Geo W. Breck.
By his Attorney - Frank L. Pope
INVENTOR
Seth G. Pope,

UNITED STATES PATENT OFFICE.

SETH G. POPE, OF OGDENSBURG, NEW YORK.

CUTTER-HEAD.

SPECIFICATION forming part of Letters Patent No. 290,923, dated December 25, 1883.

Application filed June 14, 1882. (No model.)

*To all whom it may concern:*

Be it known that I, SETH G. POPE, a citizen of the United States, residing at Ogdensburg, in the county of St. Lawrence and State of New York, have invented a new and useful Improvement in Wood-Working Tools, of which the following is a specification.

The object of my invention is to provide an adjustable machine-tool for working circular beads, grooves, or rosettes of any required size upon surfaces of wood and other materials.

My invention consists in providing a shank adapted to be inserted and held in the socket of a lathe or boring-machine, with two oppositely-projecting transverse arms, through each of which is formed a longitudinal slot or opening. Through each slot extends an adjustable clamp for securing a chisel or other wood-cutting instrument of any suitable or required form, and each clamp is arranged to be adjusted in a position more or less distant from the central revolving shank, according to the diameter of the circular bead which is to be formed.

In the accompanying drawing, which illustrates my invention, A represents a portion of the shank of the adjustable holder, which may be of any form adapted to be securely held in the socket of a turning-lathe or boring-machine. From the end of this shank extend two arms, B B, at right angles with the shank, and preferably in an opposite direction from each other. Through each arm is formed an elongated slot or opening, $b$, for receiving the shank of an adjustable clamp, C.

The clamp C consists of a short rectangular piece of metal having a square opening, as at $c$, at one end, for receiving a wood-cutting instrument, D, and provided at the opposite end with a screw-thread and a nut, as at $c'$, for binding the tool in the required position. This opening through the clamp is of a width approximately the same as that of the shank $d$ of the cutting-instrument D and of a depth somewhat exceeding the corresponding dimension of the shank. The cutting-tool D is fastened in any required lateral position by placing its shank through the opening in the clamp and tightening the nut $c'$, thus causing it to be firmly pressed against the side of the transverse arm. The face of the cutting-tool may be of any usual form or configuration, according to the cross-section of the bead or groove which is to be formed.

From the center of the lower end of the shank A projects a spur, $a$, which enters the wood or other material operated upon, and serves to steady the movement of the instrument during its revolution.

For convenience in adjusting the relative positions of the cutting-instruments, the faces of the transverse arms B B may be provided with any suitable measuring-scale graduated from the center of the shank outward, as indicated at $c^2$.

The method of operating the tool consists merely in securing a chisel or other cutting-tool in each clamp at equal distances from the center of revolution and causing the entire instrument to rotate rapidly by attaching the same to a lathe or other convenient mechanism, with the working-edge of the tool bearing against the surface to be molded. In this manner any desired circular bead, groove, or channel may be formed directly upon any surface of wood or like material, such as that of a board, post, or door-casing; or a hole may be cut through the same of any required diameter within the range of the tool.

It is evident that it is not necessary in all cases that the faces of the two cutting-instruments should precisely correspond, or that they should be placed at exactly equal distances from the center; and it may be desirable in some instances to combine the different grooves or indentations formed by each, in order to produce a final result embodying both.

I am aware that wood-working tools have been in use consisting of two knives or cutting-instruments set in reverse angular positions, and provided with a shank secured to a hub uniting said instruments; but my invention contemplates a tool with the cutting-instruments secured in vertically-parallel positions, thereby enabling a more smooth and even surface to be formed upon the material operated upon.

I claim as my invention—

The combination, with the shank A and transverse cutter-arms provided with slots $b$ at right angles thereto, and a suitable measuring-scale graduated from the center outward, of cutters and adjustable clamps therefor adapted to be adjusted in said slots $b$, and the spur or point $a$, projecting in line with the axis of shank A, substantially as shown and described.

In testimony whereof I have hereunto subscribed my name this 29th day of May, A. D. 1882.

SETH G. POPE.

Witnesses:
HENRY H. WEED,
ARTHUR DAVIS.